United States Patent
Walko et al.

(10) Patent No.: US 6,548,928 B2
(45) Date of Patent: Apr. 15, 2003

(54) GROUNDING OF STATOR CORE TO STATOR FRAME

(75) Inventors: Steven Charles Walko, Clifton Park, NY (US); Robert John Nygard, Saratoga Springs, NY (US); John Anthony Petti, Schenectady, NY (US); Richard Nils Dawson, Voorheesville, NY (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 09/745,183

(22) Filed: Dec. 22, 2000

(65) Prior Publication Data

US 2002/0079781 A1 Jun. 27, 2002

(51) Int. Cl.⁷ .................................. H02K 5/00
(52) U.S. Cl. ..................... 310/91; 310/217; 310/258
(58) Field of Search .................. 310/91, 217, 254, 310/258, 259, 42; 29/596–598, 450

(56) References Cited

U.S. PATENT DOCUMENTS

| | | | | |
|---|---|---|---|---|
| 1,980,026 A | * | 11/1934 | Wood | 310/91 |
| 2,199,156 A | * | 4/1940 | Grobel | 310/91 |
| 3,708,707 A | * | 1/1973 | Kranz | 310/258 |
| 4,031,422 A | | 6/1977 | Armor et al. | |
| 4,032,874 A | | 6/1977 | Kudlacik et al. | |
| 4,204,313 A | * | 5/1980 | Khutoretsky et al. | 29/596 |
| 4,425,523 A | * | 1/1984 | Detinko et al. | 310/258 |
| 4,584,497 A | | 4/1986 | Butman, Jr. et al. | |
| 4,634,909 A | * | 1/1987 | Brem | 310/91 |
| 4,837,471 A | * | 6/1989 | Kostoss et al. | 310/89 |
| 4,859,891 A | | 8/1989 | Jenkins et al. | |
| 4,904,890 A | | 2/1990 | Archibald et al. | |
| 4,916,803 A | | 4/1990 | Estrada | |
| 5,027,500 A | | 7/1991 | Keck et al. | |
| 5,075,959 A | | 12/1991 | Keck et al. | |
| 5,118,979 A | | 6/1992 | Shih et al. | |
| 5,316,801 A | | 5/1994 | Hopeck | |
| 5,329,197 A | | 7/1994 | Kudlacik | |
| 5,358,432 A | | 10/1994 | Shih et al. | |
| 5,430,340 A | | 7/1995 | Shih et al. | |
| 5,442,249 A | * | 8/1995 | Zimmerman | 310/91 |
| 5,473,207 A | | 12/1995 | Hopeck et al. | |
| 5,886,434 A | | 3/1999 | Nygard | |
| 5,913,243 A | | 6/1999 | Hopeck et al. | |
| 5,986,380 A | | 11/1999 | Kaminski et al. | |
| 6,020,670 A | | 2/2000 | Jones et al. | |
| 6,127,761 A | | 10/2000 | Shen et al. | |
| 6,194,807 B1 | | 2/2001 | Kaminski et al. | |
| 6,320,287 B1 | * | 11/2001 | Watson et al. | 310/91 |

FOREIGN PATENT DOCUMENTS

DE  906 475  3/1954

* cited by examiner

*Primary Examiner*—Tran Nguyen
(74) *Attorney, Agent, or Firm*—Nixon & Vanderhye P.C.

(57) ABSTRACT

A stator comprises a stator frame, a stator core and a spring. The stator core includes at least one lamination having a dovetail slot formed therein. A key bar is connected to the stator frame and includes a dovetail for engaging the dovetail slot. The spring is coupled between a portion of the lamination and the dovetail to provide an electrical ground path between the stator core and the stator frame. The spring includes a leaf spring that has first and second ends which contact the dovetail and a central portion. The central portion is connected to a base portion which contacts the lamination. Alternatively, the spring includes a base portion that contacts the lamination and prongs which project from the base portion and contact the dovetail.

10 Claims, 4 Drawing Sheets

GROUNDING OF STATOR CORE TO STATOR FRAME

BACKGROUND OF THE INVENTION

This present invention relates to electric power generators, and more particularly, to a spring that provides an effective electrical ground path between a stator core and a stator frame.

A stator of an electric power generator generally includes a stator core and a stator frame. The stator core typically has a cylindrical shape and consists of a stack of insulated steel laminations. Each lamination is a segment of a full circle that has slots on its inner diameter to accommodate a stator winding and dovetail slots on its outer diameter.

A plurality of key bars are connected (e.g., welded) to the stator frame. Each key bar includes a dovetail which provides structural support for the stator core. As the stator is assembled, each dovetail slot of a respective lamination engages a corresponding dovetail. A sufficient clearance must be provided between a portion of each lamination defining each dovetail slot and its corresponding dovetail to allow for the proper assembly of the stator considering the location and dimensional tolerances of the key bar and laminations. That is, the clearance between the three faces of each lamination forming each dovetail slot and the opposing faces of the key bar defining the dovetail must be sufficient to allow for assembly of the stator. This clearance, however, must be small enough so that each lamination can contact the corresponding dovetail in the dovetail slot to provide an electrical ground path therebetween. This small clearance between the three faces of each dovetail and corresponding lamination varies randomly due to the location and dimensional tolerances of the dovetail and dovetail slot. Due to this variable clearance, the actual contact locations between each lamination and corresponding key bar (and hence the effective contact locations between the stator core and stator frame) are randomly distributed. These randomly distributed contact locations provide the grounding of the stator core to the stator frame.

It would thus be beneficial to increase the size of the dovetail slots of the laminations to allow for a faster and easier assembly of the stator and to provide a ground circuit which enables effective grounding of the stator core to the stator frame.

BRIEF SUMMARY OF THE INVENTION

In an exemplary embodiment of the invention, a stator comprises a stator frame, at least one key bar connected to the stator frame and including a dovetail, and a stator core including at least one lamination including a dovetail slot for engaging the dovetail. The stator further comprises a spring coupled between a portion of the lamination and the dovetail to provide an electrical ground path between the stator core and the stator frame. The spring is arranged within the dovetail slot. The spring includes a leaf spring that comprises a first end, a second end and a central portion. The spring also includes a base portion and first and second side flaps. The first and second ends of the leaf spring contact the key bar and the central portion of the leaf spring is connected to the base portion. The base portion contacts the lamination. The side flaps are connected to the base portion and contact the lamination.

In another exemplary embodiment of the invention, the spring which provides the electrical ground path between the stator core and the stator frame includes a base portion that contacts the lamination and at least one prong. The prong comprises a first end that is connected to the base portion and a second end that is arranged spatially apart from the base portion. The second end contacts the dovetail of the key bar. The spring can include a plurality of prongs each of which is aligned along a single axis that extends parallel to the length of the base portion, or alternatively, a plurality of prongs some of which are aligned along a first axis that extends parallel to a length of the base portion and others of which are aligned along a second axis that extends parallel to the length of the base portion.

BRIEF DESCRIPTION OF THE DRAWINGS

These, as well as other advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
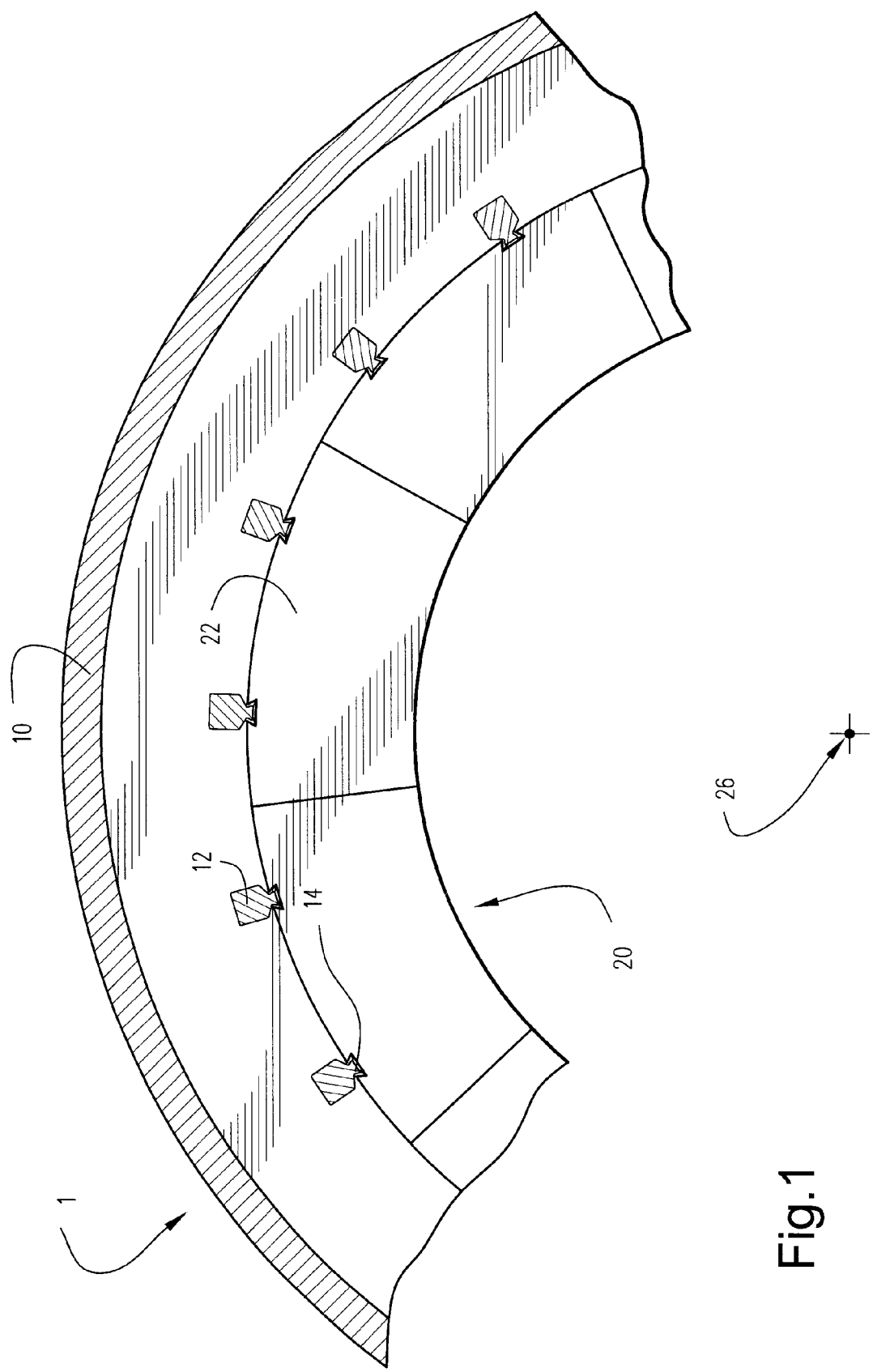
FIG. 1 is a partial cross-sectional view of a stator according to an exemplary embodiment of the present invention.
Figure 2:
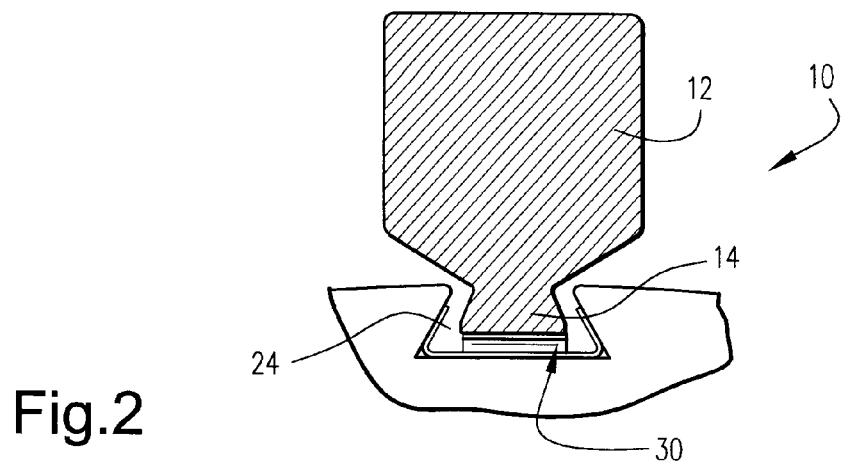
FIG. 2 is a partial cross-sectional view of a dovetail connection illustrated in FIG. 1.
Figure 4:
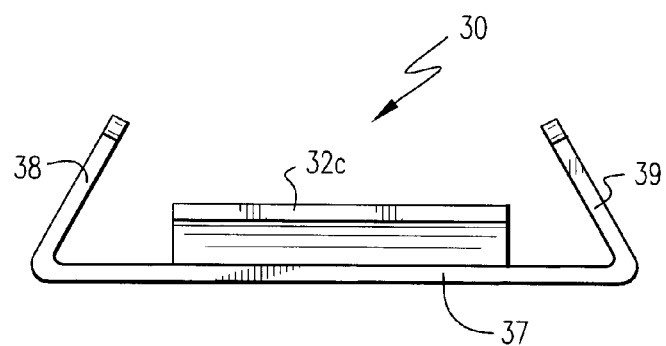
FIG. 4 is a end view of the spring illustrated in FIG. 1.
Figure 5:
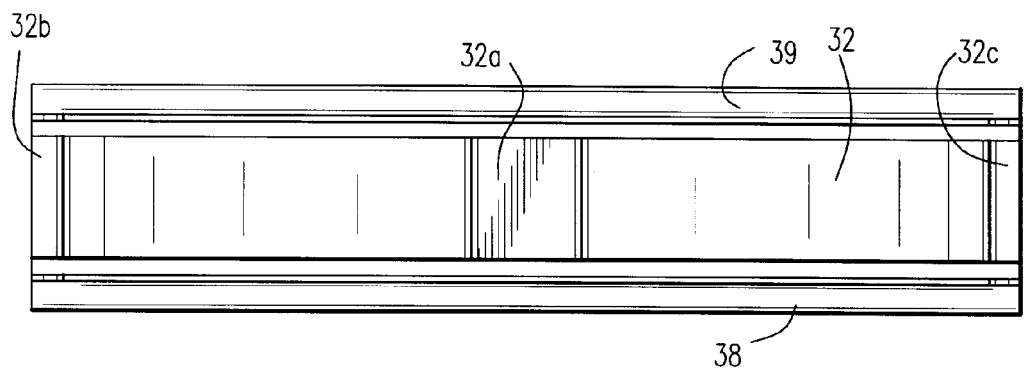
FIG. 5 is a top view of the spring illustrated in FIG. 1.
Figure 3:
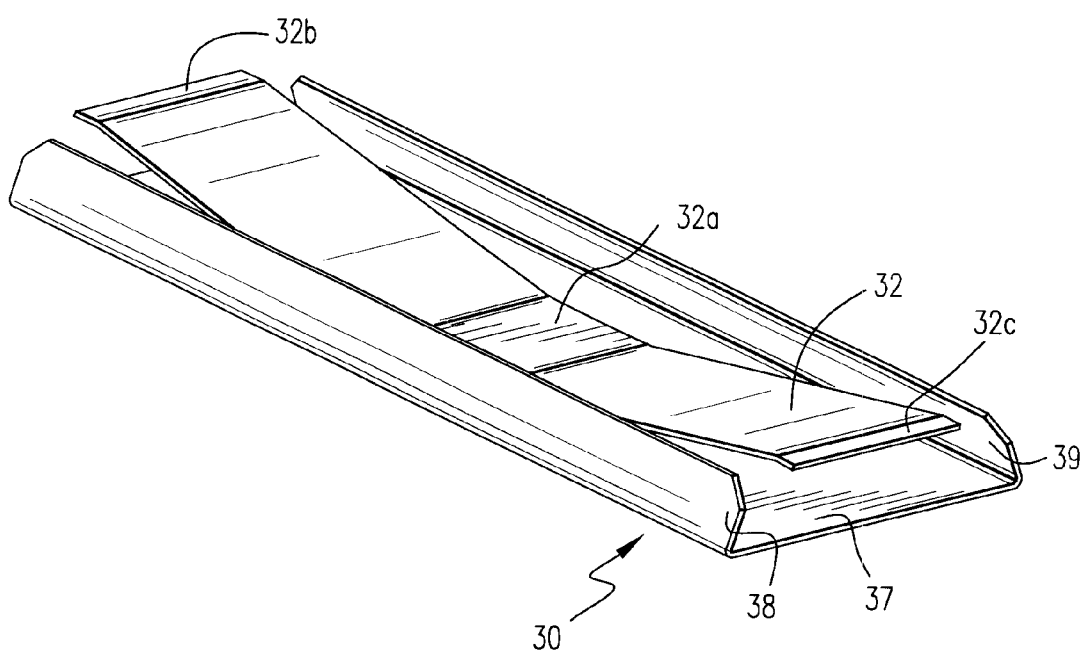
FIG. 3 is a schematic perspective view of the spring illustrated in FIG. 1.

FIG. 1 is a partial cross-sectional view of a stator 1 of an electric power generator according to an exemplary embodiment of the present invention. The stator 1 includes a stator core 20 formed by a plurality of stacked laminations 22 and a stator frame 10 which has a plurality of key bars 12 connected thereto. Each of the laminations 22 has slots (not shown) on its inner diameter to engage a stator winding an d a plurality dovetail slots 24 on its outer diameter to engage corresponding key bars 12.

Each of the key bars 12 connected to the stator frame 10 has a dovetail 14 which engages into a corresponding dovetail slot 24 of each of the laminations 22. A relatively large clearance space is provided between the three faces of the dovetail 14 and a lamination 22 defining the corresponding dovetail slot 24 so that the dovetail 14 can be engaged within the dovetail slot 24 and assembly of the stator core 20 easily accomplished. The clearance space is large enough so that there is no random direct contact between the key bars 12 and the corresponding laminations 22 even considering the location and dimensional tolerances of the key bars 12 and the laminations 22. This relatively large clearance space allows for the easier and faster assembly of the stator core 20.

Referring now to FIGS. 1–5, axial springs 30 are respectively coupled between the dovetails 14 of the key bars 12 and a portion of the corresponding laminations 22 which define the dovetail slots 24. While the discussion below refers to only one lamination 22, one dovetail slot 24, one key bar 12, one dovetail 14 and one spring 30, it will be appreciated that the details below are equally applicable to all others forming the stator core 20. The spring 30 is arranged within the dovetail slot 24 and contacts both the key bar 12 and the lamination 22 to establish an electrical ground path therebetween. Accordingly, an electrical ground circuit is established between the stator core 20 and the stator frame 10 via the spring 30. The positioning of the contact locations between the spring 30 and the key bar 12 and the lamination 22 can be precisely controlled. Thus, randomly distributed contact locations (i.e., randomly distributed grounding points) between the key bar 12 and the lamination 22 can be eliminated.

The spring 30 includes a leaf spring 32, a base portion 37 and first and second side flaps 38, 39. The leaf spring 32 includes a central portion 32a and first and second ends 32b, 32c. The first and second ends 32b, 32c of the leaf spring 32 contact the dovetail 14 of the key bar 12. The central portion 32a of the leaf spring 32 is connected (e.g., spot welded) to the base portion 37. The first and second side flaps 38, 39 are connected, preferably integrally connected, to the base portion 37. The first and second side flaps 38, 39 are arranged to directly contact the lamination 22. Specifically, the first and second side flaps 38, 39 directly contact the opposing faces of the lamination 22 which define the dovetail slot 24. The spring 30 can be tightly engaged and held within the dovetail slot 24 through the contact of the side flaps 38, 39 with the opposing faces of the lamination 22 defining the dovetail slot 24. The base portion 37 is also arranged to contact a face of the lamination 22 defining the dovetail slot 24. Specifically, the base portion 37 directly contacts the face of the lamination 22 forming the dovetail slot 24 which is closest to the longitudinal axis 26 of the stator core 20. By contacting the lamination 22 through the first and second side flaps 38, 39 and base portion 37, and contacting the dovetail 14 through first and second ends 32b, 32c of the leaf spring 32, the spring 30 provides an electrical ground path between the lamination 22 and the key bar 12 (and hence the stator core 20 and the stator frame 10).

Figure 6:
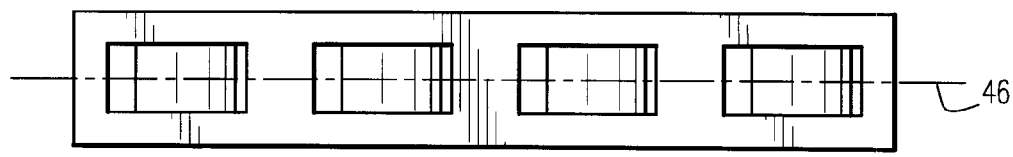
FIG. 6 is a top view of a spring according to an alternate exemplary embodiment of the present invention.
Figure 7:
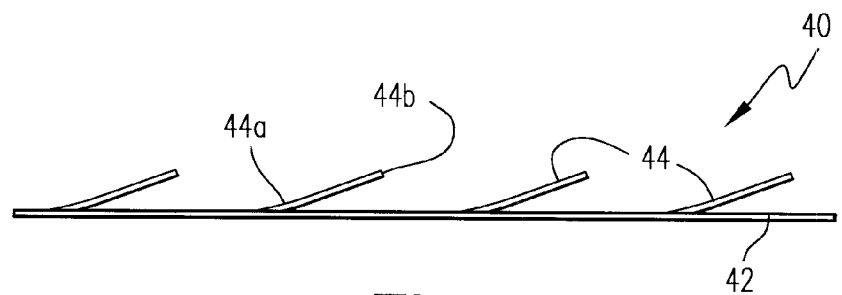
FIG. 7 is a front view of the spring illustrated in FIG. 6.

FIGS. 6–7 illustrate a spring 40 according to an alternate exemplary embodiment of the present invention. The spring 40 includes a base portion 42 and a plurality of prongs 44. Each of the prongs 44 has a first end 44a which is connected to the base portion 42. Each of the prongs 44 projects away from the base portion 42 so that a second end 44b of the each of the prongs 44 is arranged spatially distant and apart from the base portion 42. Similar to the spring 30 illustrated in FIGS. 1–5, the spring 40 can be arranged within a dovetail slot 24 and between a portion of the lamination 22 that defines the dovetail slot 24 and the dovetail 14 of the key bar 12. Specifically, the base portion 42 can be arranged on the face of the lamination 22 forming the dovetail slot 24 which is closest to the longitudinal axis 26 of the stator core 20 so that the second ends 44b of the respective prongs 44 can directly contact the dovetail 14. As illustrated in FIG. 6, each of the prongs is aligned along a single axis 46 which extends parallel to the length of the spring 40 and the longitudinal axis 26 and bisects its width.

Figure 8:
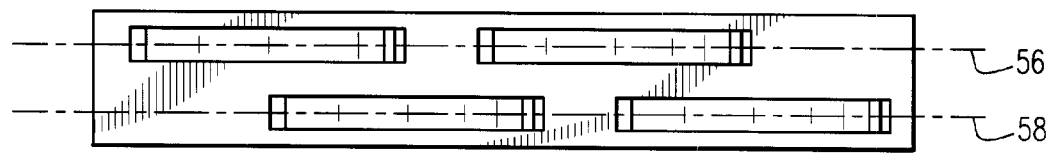
FIG. 8 is a top view of a spring according to a further alternate exemplary embodiment of the present invention.
Figure 9:
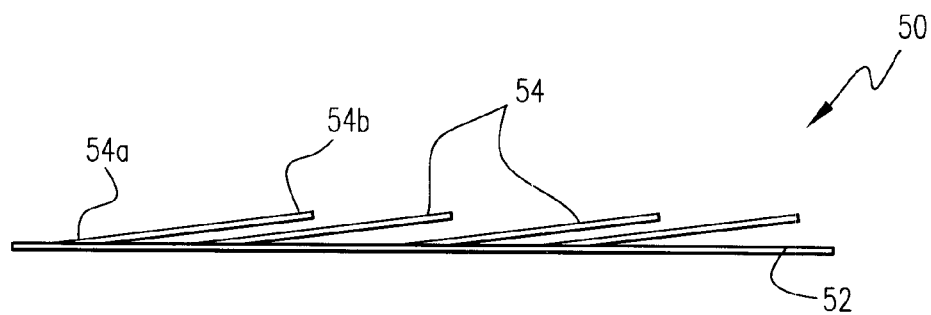
FIG. 9 is a front view of the spring illustrated in FIG. 8.

FIGS. 8–9 illustrate a spring 50 according to a further alternate exemplary embodiment of the present invention. Similar to the spring 40 illustrated in FIGS. 6–7, spring 50 includes a base portion 52 and a plurality of prongs 54. Each prong 54 has a first end 54a which is connected to the base portion 52. Each prong 54 projects away from the base portion 52 towards a second end 54b which is spatially distant and apart from the base portion 52. Each of the second ends 54b contacts the respective dovetails 14. Unlike the prongs 44 of the spring 40, the prongs 54 of spring 50 are aligned along two different axes. That is, some of the prongs 54 are aligned along a first axis 56 which extends parallel to the length of the base portion 52 and the other prongs are aligned along a second axis 58 which also extends parallel to the base portion 52. The spring 50 is arranged within the dovetail slot 24 so that axes 56, 58 extend parallel to the longitudinal axis 26.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator comprising:

a stator frame;

at least one key bar connected to said stator frame, said key bar including a dovetail;

a stator core including at least one lamination having a dovetail slot formed therein to engage said dovetail; and a spring coupled between a portion of said lamination and said dovetail to provide an electrical ground path between said stator core and said stator frame;

wherein said leaf spring comprises a first end, a second end and a central curved portion, said first and second ends contacting said dovetail.

2. The stator of claim 1 wherein said spring is arranged in said dovetail slot.

3. The stator of claim 1 wherein said spring further comprises a base portion, said base portion contacting said central portion of said leaf spring and also contacting said lamination.

4. The stator of claim 3 wherein said spring further comprises a first side flap and a second side flap, said first and second side flaps being connected to said base portion and contacting said lamination.

5. A stator comprising:

a stator frame;

at least one key bar connected to said stator frame, said key bar including a dovetail;

a stator core including at least one lamination having a dovetail slot formed therein to engage said dovetail; and a spring coupled between a portion of said lamination and said dovetail to provide an electrical ground path between said stator core and said stator frame;

wherein said spring includes:

a base portion that contacts said lamination; and at least one prong comprising a first end and a second end, said first end being connected to said base portion and said second end being arranged spatially apart from said base portion.

6. The stator of claim 5 wherein said spring includes a plurality of prongs each of which is aligned along a single axis that extends parallel to a length of said base portion.

7. The stator of claim 5 wherein said spring includes a plurality of prongs at least one of which is aligned along a first axis that extends parallel to a length of said base portion and at least another of which is aligned along a second axis that extends parallel to said length of said base portion.

8. The stator of claim 5 wherein said second end contacts said dovetail.

9. The stator of claim 5, wherein the spring is arranged in a dovetail slot.

10. A stator comprising:

a stator frame;

at least one key bar connected to said stator frame, said key bar including a dovetail;

a stator core including at least one lamination having a dovetail slot formed therein to engage said dovetail; and a spring coupled between a portion of said lamination and said dovetail to provide an electrical ground path between said stator core and said stator frame;

wherein said spring includes a leaf spring.

* * * * *